United States Patent [19]

Szymaszek

[11] 3,924,972
[45] Dec. 9, 1975

[54] CONTROL MEANS FOR A VARIABLE CAPACITY ROTARY SCREW COMPRESSOR

[75] Inventor: Paul G. Szymaszek, Milwaukee, Wis.

[73] Assignee: Vilter Manufacturing Corporation, Milwaukee, Wis.

[22] Filed: Oct. 29, 1974

[21] Appl. No.: 518,267

[52] U.S. Cl. ............................................... 417/310
[51] Int. Cl.² ......................................... F04B 49/00
[58] Field of Search ............ 417/310; 251/131, 130, 251/30; 137/487.5; 91/363 R

[56] References Cited
UNITED STATES PATENTS

| | | | |
|---|---|---|---|
| 2,644,427 | 7/1953 | Sedgfield | 251/131 X |
| 2,949,273 | 8/1960 | Roper | 251/131 X |
| 3,068,387 | 12/1962 | Koppel | 137/487.5 X |
| 3,295,421 | 1/1967 | McCormick | 91/363 R |
| 3,375,659 | 4/1968 | Ray | 91/363 R X |
| 3,527,548 | 9/1970 | Kocker | 417/310 |
| 3,738,780 | 6/1973 | Edstrom | 417/310 X |

*Primary Examiner*—Alan Cohan
*Attorney, Agent, or Firm*—James E. Nilles

[57] ABSTRACT

A variable capacity rotary screw compressor has a pair of helical rotors mounted within a housing for compressing fluid and an axially movable slide valve in the housing to control the capacity of the compressor. Control means are provided for moving the slide valve to regulate or adjust compressor capacity and comprise an hydraulic actuator including a movable piston connected to the slide valve and a pair of solenoid valves for controlling hydraulic fluid flow between a pump and the actuator to effect piston and slide valve movement. The control means also comprises a bridge balancing relay which receives input control signals from either an automatic control unit or a manually operable control unit and compares the control signals with feedback signals indicative of valve spool position and provides output signals for operating the solenoid valves accordingly. The automatic control unit provides a control signal indicative, for example, of a system condition to operate the compressor at a capacity necessary to maintain the system condition constant. The manual control unit provides a control signal to move the slide valve to a desired fixed position and to maintain the slide valve in that position. The feedback signal is indicative of slide valve position and is compared in the bridge balancing relay with the control signal from either the automatic or manual control units, whichever is operating, to effect proper positioning of the slide valve.

15 Claims, 4 Drawing Figures

CONTROL MEANS FOR A VARIABLE CAPACITY ROTARY SCREW COMPRESSOR

BACKGROUND OF THE INVENTION

1. Field of Use

This invention relates generally to electro-hydraulic control means for a variable capacity compressor. In particular, it relates to such a control means for operating the control valve of such a compressor whereby the capacity of the compressor can be selectively controlled automatically or manually.

2. Description of the Prior Art

A variable capacity rotary screw compressor has a pair of helical rotors mounted within a housing for compressing fluid drawn from a low pressure suction fluid chamber and discharging the compressed fluid to a discharge chamber. Some such compressors have an axially movable slide valve in the compressor housing to control the capacity of the compressor in a known manner. In some prior art compressors a portion of the slide valve spool or a member connected thereto, extends outwardly from an end of the compressor housing and compressor capacity can be controlled or regulated by moving the slide valve spool axially in one direction to increase capacity and in the opposite direction to reduce capacity. It is known to control compressor capacity automatically, in response to variations in an operating condition in the system wherein the compressor is used by providing condition responsive actuator means which are connected to the outwardly extending member to effect slide valve movement. It is also known to manually control compressor capacity by manually moving the outwardly extending member or portion of the slide valve spool to thereby move the slide valve and to thereafter maintain the slide valve in the position to which moved by suitable mechanical locking means connected to the outwardly extending member or portion of the slide valve spool. U.S. Pat. applications Ser. Nos. 449,263 and 403,195, assigned to the same assignee as the present application, disclose compressors of the type under consideration and the latter application depicts a compressor of the type wherein the slide valve may be mechanically locked into a desired position when operation is in the manual mode. It is also known to sense and indicate the position of a manually adjusted slide valve spool by means of a potentiometer. Furthermore, it is known to employ manually adjustable limit switches responsive to changes in valve spool position, after the spool has been manually positioned, to reposition the valve spool.

SUMMARY OF THE INVENTION

A variable capacity rotary screw compressor has a pair of helical rotors mounted within a housing for compressing fluid drawn from a low pressure suction fluid port and discharging the compressed fluid to a discharge port. A slide valve, including an axially movable spring-biased slide valve spool, is provided in the housing to control the capacity of the compressor.

Control means operable in either an automatic or a manual mode are provided to effect axial movement of the slide valve spool and thereby control the capacity of the compressor. In the manual mode the control means effect movement of the slide valve to a desired fixed position and maintain it in that position. Such positioning of the slide valve spool establishes fixed displacement within the compressor and results in compressor operation at some desired percentage of full capacity. In the automatic mode the control means sense or monitor a system condition and respond to a departure at the condition from a desired level or range to vary the compressor capacity accordingly to the extent necessary to maintain the system condition at the desired level or in the desired range. The system condition being sensed or monitored may be, for example, the suction pressure at the compressor, or the temperature in the evaporators associated with the compressor, or a fluid being cooled by the compressor, or a similar condition.

The control means comprise an hydraulic actuator having a piston connected to effect movement of the slide valve spool. A pair of solenoid valves are provided for controlling hydraulic fluid flow to and from the actuator to effect movement of the slide valve spool in a desired direction. The control means further comprise a bridge balancing relay having control signal input terminals, feedback signal input terminals, and output terminals for operating the solenoid valves in response to the input signals. An automatic control unit or manual control unit provide the control input signal to the control signal input terminals of the bridge balancing relay. The automatic control unit includes a first potentiometer adjustable in response to the system condition to provide a control signal indicative of the system condition to operate the compressor at a capacity necessary to maintain the system condition at a desired level or range. The manual control unit, which is employed when the automatic control unit is turned off, includes a second potentiometer which is manually adjustable to provide a control signal to effect movement of the slide valve spool to a desired fixed position. The control means also includes feedback signal means for maintaining compressor capacity at an appropriate level during operation in the automatic and for maintaining the valve spool in its fixed position during operation in the manual mode. The feedback signal means includes a third potentiometer adjustable is response to the position of the slide valve spool to provide a feedback signal to the feedback signal terminals of the bridge balancing relay.

The control means further include a fourth potentiometer mechanically connected to the slide valve shaft and electrically connected to low voltage power supply and to a remotely located voltmeter calibrated in percentage of machine capacity. The voltage drop across the fourth potentiometer represents slide valve position, i.e., the capacity at which the compressor is operating. Thus, the voltmeter continually monitors slide valve position and visually indicated to the operator the percent of machine capacity at any instant.

During operation in the manual mode wherein the slide valve spool is to be maintained in some desired fixed position, initial manual adjustment of the manual control potentiometer provides a control signal to the bridge balancing relay which effects operation (opening) of the appropriate solenoid valve to cause the hydraulic actuator to effect movement of the slide valve spool to a desired fixed position wherein the compressor operates at some fixed displacement and compressor capacity is at some percentage of full capacity, whereupon the solenoid valve closes. Movement of the slide valve spool to such position simultaneously adjusts the feedback potentiometer to provide a feedback signal to the bridge balancing relay wherein the feedback signal and the control signal are compared. When the feedback signal and the control signal are balanced, there is no output signal from the bridge balancing relay and the solenoid valves are closed. However, if the spring-biased slide valve spool should shift from its fixed position as a result of hydraulic fluid leakage from the hydraulic actuator, the feedback potentiometer senses this shift and provides a feedback signal to the bridge balancing relay. The relay responds to the imbalance between the feedback signal and manual control signal to open the appropriate solenoid valve and cause the actuator to return the slide valve spool to its initial fixed position.

During operation in the automatic mode wherein compressor capacity is to be varied so as to maintain the system condition being monitored at some desired level or within a desired range, adjustment of the automatic control potentiometer in response to a change in the system condition being monitored provides a control signal to the bridge balancing relay wherein it is compared to feedback signal information being received from the feedback potentiometer. The bridge balancing relay sensing the resistance change taking place in the control potentiometer endeavors to balance this resistance change with an equal change of resistance value of the feedback potentiometer and thus provides an output signal for operating the appropriate solenoid valve. The bridge balancing relay will, by energizing the proper solenoid valve, operate the actuator to move the slide valve spool to a new position wherein compressor capacity is at a level necessary to maintain the system condition at the desired level or range. The relay will keep the appropriate solenoid valve energized until such time as the automatic control potentiometer and the feedback potentiometer are sending the same resistance signal to the bridge balance relay.

Control means in accordance with the invention offer several advantages. For example, operation in either the manual or automatic mode may be easily carried out by means of a mode selector switch. Furthermore, operation in the manual mode is carried out merely by manipulation of the manual control potentiometer located on operator's control panel. This is a significant advance because in the prior art arrangements wherein the spool was mechanically locked in a fixed position for operation in the manual mode, readjustment required manual unlocking and manual repositioning of the valve spool on the compressor itself. Another advantage of the present control means is that certain control elements are commonly useable for operation in either the manual or automatic mode. In addition, undesirable shifting of the slide valve spool from fixed position during operation to the manual mode is automatically corrected. The control means also employs, for the most part, standard commercially available control elements which may be easily serviced or replaced if necessary. Other objects and advantages of the invention will hereinafter appear.

DRAWINGS

DESCRIPTION OF A PREFERRED EMBODIMENT

Figure 1:
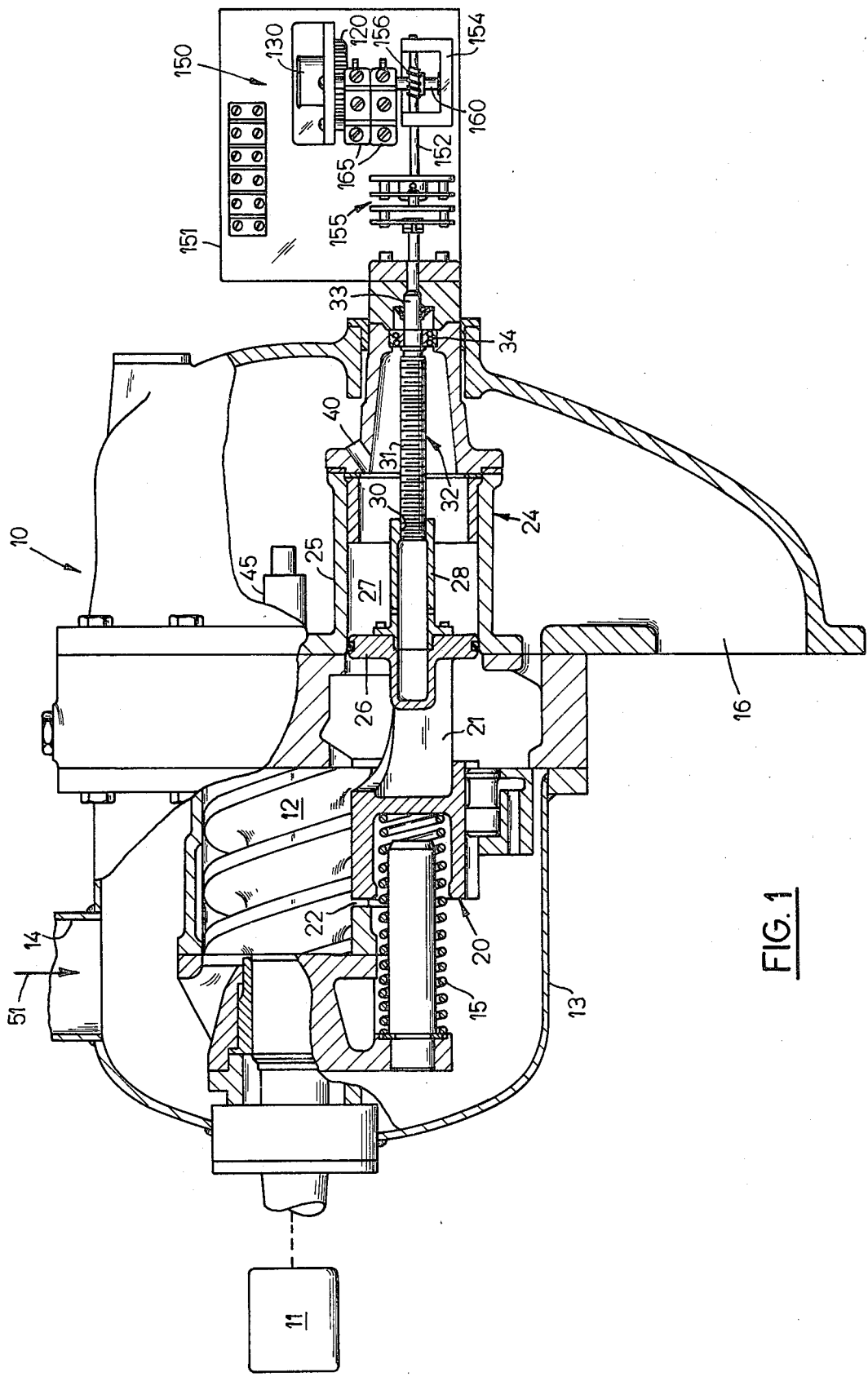
FIG. 1 is a side elevation view, partly in section, of a variable capacity rotating screw compressor showing the slide valve spool and the hydraulic actuator therefor in minimum capacity position.
Figure 2:
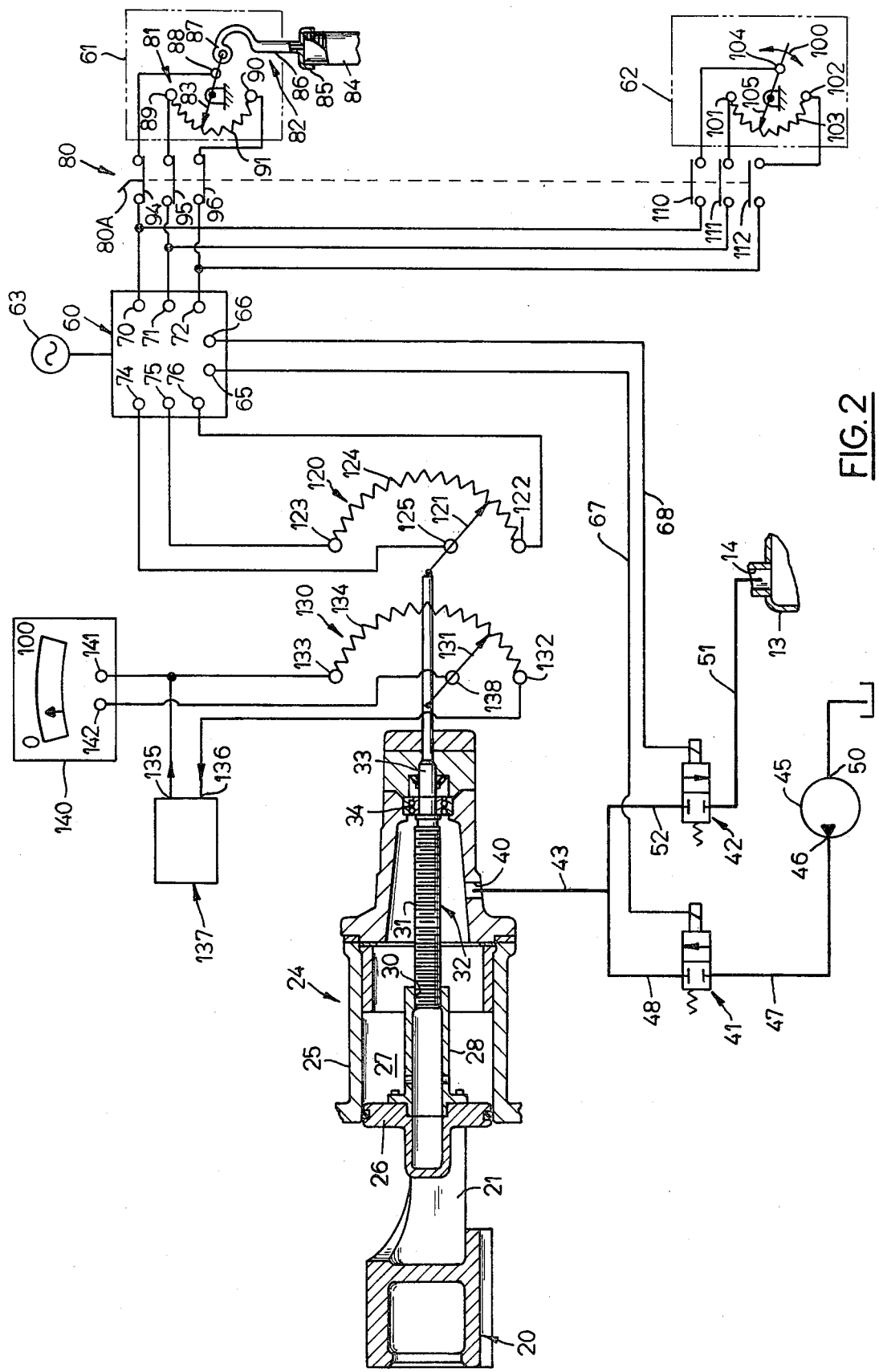
FIG. 2 is a schematic diagram of an electro-hydraulic control means in accordance with the invention for operating the hydraulic actuator shown in FIG. 1.

Referring to FIG. 1, a variable capacity rotary screw compressor 10, driven by an electric motor 11, has a pair of helical rotors 12 (only one of which is shown) mounted within a housing 13 for compressing fluid drawn from a low pressure suction fluid inlet 14 and discharging the compressed fluid to a discharge outlet 16. A slide valve 20, including an axially movable slide valve spool 21, is provided in the housing 13 to control the capacity of the compressor 10. In FIGS. 1 and 2, slide valve spool 21 is shown positioned very close to maximum capacity position, i.e., in position wherein port 22 is almost closed. Spool 21 is movable rightward with respect to FIGS. 1 and 2 to a minimum capacity position. A biasing spring 15 is disposed between a fixed portion of housing 13 and slide valve spool 21 and tends to bias the spool rightward toward minimum capacity position.

Referring to FIGS. 1 and 2, control means are provided to adjust slide valve 20 by effecting axial movement of the slide valve spool 21 to thereby control the capacity of the compressor 10. The control means comprise an hydraulic actuator 24, which cooperates with valve spool biasing spring 15, to adjust the position of slide valve 20 by effecting axial movement of the slide valve spool 21. Actuator 24 is built into housing 13 and comprises a cylinder 25 rigidly secured to the housing and a piston 26 slideably mounted in the cylinder and cooperating therewith to define an hydraulic fluid chamber 27 on one side of the piston. The piston 26 is rigidly connected to or integral with one end of the slide valve spool 21 and both are axially movable together. The piston 26 rigidly supports a hollow cylindrical member 28 which has a threaded bore 30 at one end through which a threaded shaft portion 31 of a rotatable shaft 32 extends. The shaft 32 has an unthreaded portion 33 which is supported by means of an anti-friction bearing 34 and extends outwardly of one end of the housing 13. As the piston 26 and slide valve spool 21 are moved axially, the shaft 32 rotates in one direction or the other, depending on the direction of piston and valve spool movement, due to the interaction of the threads 30 on member 28 and the threaded portion 31 of shaft 32. The rotating motion of shaft 32 is transmitted to operate components of the electrical control system connected thereto, as hereinafter described.

A passage 40 communicates with the chamber 27 in the cylinder 25 of actuator 24 and a fluid line 43 connected thereto serves as a means by which hydraulic operating fluid is supplied to or expelled from the chamber 27 to effect movement of piston 26 and corresponding positioning of the slide valve spool 21. A pair of solenoid valves 41 and 42 are provided for controlling hydraulic fluid flow to and from the actuator 24 to control or operate the latter and effect movement or positioning of the slide valve spool 21, i.e., adjustment of slide valve 20.

A pump 45 is provided to supply hydraulic fluid to actuator 24. The pump 45 which may be mounted within compressor housing 13, as shown in FIG. 1, and driven by compressor 20 from motor 11, is provided to supply hydraulic fluid in the form of oil at high pressure from its pressure port 46 through a line 47, through solenoid valve 41, through a line 48 and through line 43 to the chamber 27 of actuator 24. The solenoid valve 41 operates, when open, to supply fluid from pump 45 to the chamber 27 to cause the actuator piston 26 to move the slide valve spool 21 against the biasing action of spring 15 toward the maximum capacity position (i.e., leftward with respect to FIGS. 1 and 2 so that port 22 closes). It is to be understood that the pump supplies the hydraulic fluid at a pressure which, for example, exceeds by 40 or 50 p.s.i. the maximum pressure of refrigerant within the compressor. Pump 45 is supplied with oil from a reservoir. In practice, pump 45 is also used to supply oil through port 14 of compressor 10 for lubrication of components within the compressor and for other purposes. The suction port 14 of compressor 10 is connected through a line 51, through solenoid valve 42, through a line 52 and through line 43 to the chamber 27 of actuator 24 to permit oil to be expelled from the chamber 27 and drained to suction port 14 when the solenoid valve 42 is open. When solenoid valve 42 is open, slide valve spool 21 and piston 26 are able to move rightward as a unit under the biasing action of spring 15. As spool 21 moves toward its minimum capacity position (i.e., rightward with respect to FIGS. 1 and 2) the port 22 opens. It is to be understood that the solenoid valves 41 and 42 are conventional two-way normally closed types which open when their solenoids are energized. A type V-12 solenoid valve manufactured by Skinner Electric Valve Division, New Britain, Conn. was employed in an actual embodiment of the invention. During system operation either one or both solenoid valves may be closed, but both valves never open simultaneously. It may be assumed for purposes of this disclosure that opening of the solenoid valve 41 increases the compressor capacity and that opening of the solenoid valve 42 decreases the compressor capacity. The solenoid valves 41 and 42 open in response to a voltage applied to the solenoid terminals thereof from a bridge balancing relay 60 hereinafter described.

The control means also comprises the bridge balancing relay 60 for operating the solenoid valves 41 and 42; an automatic control unit 61 and a manual control unit 62 for providing control signals to the bridge balancing relay; and a feedback unit for providing a feedback signal to the bridge balancing relay. Either the automatic control unit 61 or the manual control unit 62 may be operated, depending upon the condition of a mode selector switch 80.

The bridge balancing relay 60 is a conventional electronic proportioning amplifier used to provide operating power to the solenoid valves in response to control signals and feedback signals supplied thereto. In an actual embodiment of the present invention a Model R7103C bridge balancing relay manufactured by Honeywell, Apparatus Controls Division, Minneapolis, Minn. was employed. The bridge balancing relay 60 is supplied wtih electrical power from a suitable power source 63 and comprises power output terminals 65 and 66 for energizing the increase solenoid valve 41 and for energizing the decrease solenoid valve 42, respectively, through conductors 67 and 68, respectively. In practice, the solenoid coil of each solenoid valve 41, 42 is provided with two terminals and a pair of terminals are provided on relay 60 for connection to each pair of solenoid coil terminals. The relay 60 further comprises three control signal input terminals 70, 71 and 72 and three feedback signal terminals 74, 75 and 76. The relay operates to compare the control unit signal and the feedback input signal and, if the signals are balanced, to provide no output signal (i.e., no operating signals for the solenoids 41 and 42) at its terminals 65 and 66. However, if there is an imbalance between the control input signal and the feedback input signal, either the terminal 65 or the terminal 66 will be energized to operate the increase solenoid valve 41 or the decrease solenoid valve 42, respectively.

The automatic control unit 61 includes a first potentiometer 81 adjustable to provide an automatic control signal indicative of the level or range of some system condition being monitored to operate the compressor 10 at a capacity relative to the system condition. The system condition being sensed and controlled could, for example, be suction pressure at port 14 of compressor 10 or temperature in an evaporator associated with the compressor, or the temperature of a fluid coolant, or a similar condition. In the embodiment shown in FIG. 2 it may be assumed that system pressure at port 14 is being monitored and the means to accomplish this comprises a pressure sensing and control device 82 which effects movement of the slider 83 of the potentiometer 81 in response to changes or variations in system pressure at port 14. The sensing device 82, which could take any suitable form such as a bourdon tube or bellows, is connected to a fluid sensing supply line 84 which, in turn, is connected to the suction port 14 of compressor 10. For example, a cap 85 is screwed onto the end of the sensing line 84 and is connected to a curved hollow bourdon tube 86 which terminates in a hollow tube bulb 87. Bulb 87 is mechanically connected to rotatable potentiometer slider 83. As suction pressure changes at port 14, in line 84, in tube 86 and in bulb 87, the bulb moves upwardly or downwardly and transmits such motion to the potentiometer slider 83. The end terminals 89 and 90 of the potentiometer coil 91 and the terminal 88 of the potentiometer slider 83 are connected to the control signal input terminals 70, 71 and 72, respectively, of the bridge balancing relay 60 through the contacts 94, 95 and 96, repectively, of the manually operable mode selector switch 80, which contacts are shown in closed position for automatic mode operation. In an actual embodiment the control unit 61 may take the form of a pressure control including the pressure sensing device 82 and the potentiometer 81. A Series PB-2000 pressure control manufactured by Penn Controls, Inc., Goshen, Ind. was employed in an actual embodiment of the present invention. In such a pressure control the potentiometer slider is positioned in direct relation to the pressure variations which occur and thus produces a variable voltage signal which is indicative of the sensed pressure and the voltage signal is fed to the bridge balancing relay.

It is to be understood that, instead of pressure at port 14 of compressor 10, another condition such as temperature at some point in the system associated with the compressor could be sensed and responded to in a similar manner as pressure, provided that the potentiometer slider 83 were mechanically connected to and responsive to movement of the condition responsive element. For example, a temperature control suitable for use in the present invention as a substitute for the pressure control may take the form of a Series TB temperature control manufactured by Penn Controls, Inc., Goshen, Ind. In such a control a sensing element, generally similar to device 82 but of the partial liquid filled type, is employed to position the potentiometer slider 83 in accordance with temperature changes. A temperature increase, for example, causes a portion of the liquid to vaporize which, in turn, produces a positive pressure increase in the sensitive bellows thereby expanding the bellows, and the resultant movement directly positions the potentiometer slider 83.

The manual control unit 62 includes a second potentiometer 100 adjustable to provide a control signal to operate the compressor at a desired capacity. The end terminals 101 and 102 of the potentiometer coil 103 and the terminal 104 of the potentiometer slider 105 are connected to the input signal terminals 71, 72 and 70, respectively, of the bridge balancing relay 60 through the contacts 111, 112 and 110, respectively, of manually operable selector switch 80, which contacts are shown in open position for automatic mode operation.

The control means also includes feedback signal means for maintaining compressor capacity at the level set by either the automatic or manual control units 61 or 62, respectively, whichever is operating. The feedback signal means includes a third or feedback potentiometer 120 having a slider 121 mechanically connected to and adjustable in response to the position of the slide valve spool 21. The end terminals 122 and 123 of the potentiometer coil 124 and the terminal 125 of the potentiometer slider 121 are connected to the input signal terminals 76, 75 and 74, respectively, to the bridge balancing relay 60.

The selector switch 80 comprises a manually operable control lever 80A for shifting the switch contacts between the manual and automatic modes. In automatic mode the contacts 94, 95 and 96 are closed to connect the automatic control unit 61 for operation and the contacts 110, 111 and 112 are open to disconnect the manual control unit 62. In manual mode the contacts 110, 111 and 112 are closed to connect the manual control unit 62 for operation, whereas contacts 94, 95 and 96 are open.

The control system also includes a fourth or meter potentiometer 130 having a slider 131 mechanically connected to and adjustable in response to the position of the slide valve spool 21. The end terminals 132 and 133 of coil 134 of potentiometer 130 are connected to the power output terminals 135 and 136 of a source of low voltage a.c. power 137. The voltage drop across the end terminal 133 and the slider terminal 138 of potentiometer 130 is indicated on a remotely located voltmeter 140 which has its terminals 141 and 142 connected to the terminals 133 and 138 and to terminal 135 of the low voltage power supply 137. Meter 140 is calibrated in percent of machine capacity. The voltmeter 140 continually monitors slide valve position and visually indicates to the operator the percent of machine capacity at any instant.

Figure 3:
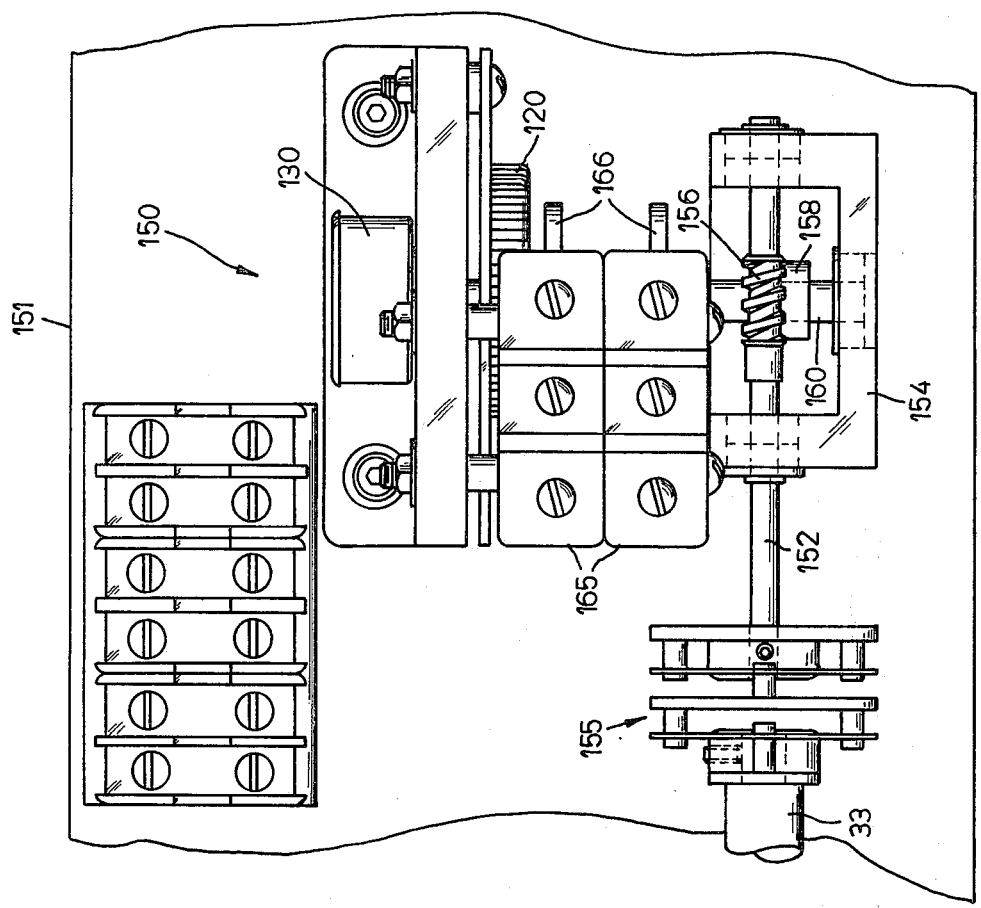
FIG. 3 is a top plan view of a feedback mechanism for transmitting feedback signal information indicative of slide valve spool position to portions of the control means and to a meter shown in FIG. 2.
Figure 4:
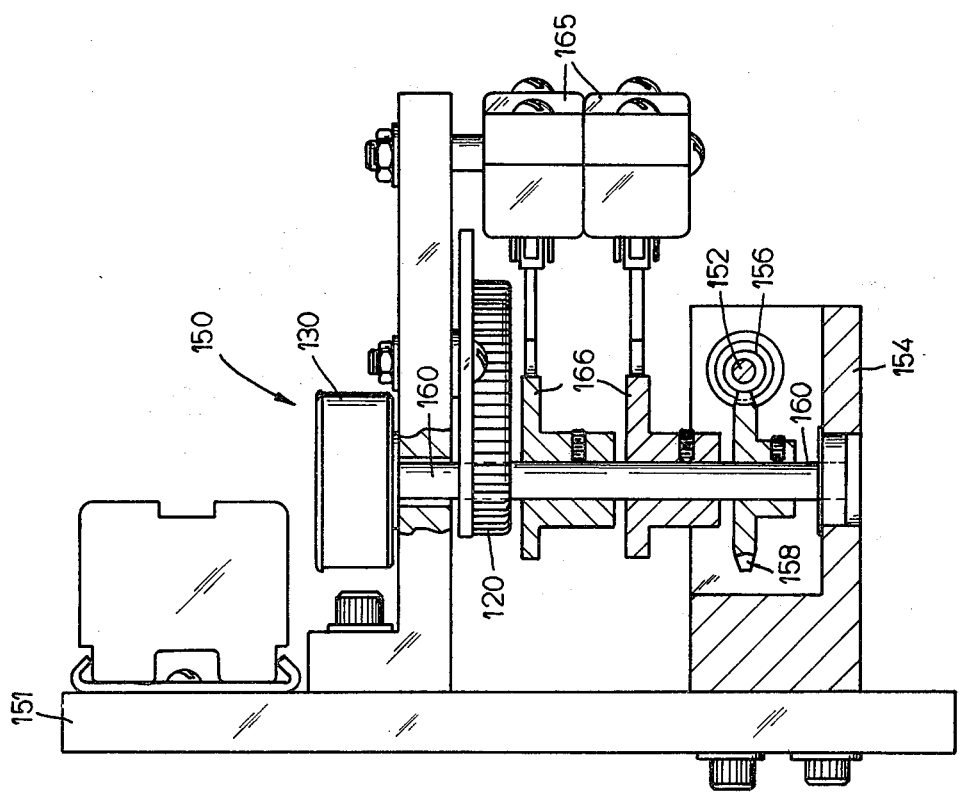
FIG. 4 is a side elevation view of the feedback mechanism shown in FIG. 3.

Referring to FIGS. 1, 3 and 4, there is shown a feedback mechanism 150 for transmitting feedback information indicative of slide valve spool position to both the feedback potentiometer 120 and the meter potentiometer 130. The feedback mechanism 150 comprises a supporting base 151 rigidly secured to the compressor housing 13 and upon which are mounted the potentiometers 120 and 130 and suitable mechanical drive means for driving their sliders 121 and 131, respectively, from the rotatable slide valve shaft 32 extending from compressor housing 13. Supporting base 151 is provided with two rigidly attached spaced apart support brackets 154 and 162. The mechanical drive means include a first shaft 152 supported for rotation on support bracket 154 and flexible coupling means 155 for connecting one end of the rotatable shaft 32 to an end of shaft 152. The shaft 152 is provided with a worm 156 secured thereon for rotation therewith which meshes with a worm gear 158 secured on a second rotatable shaft 160 which is disposed transversely to the first shaft 152. The shaft 160 is supported by and between the bracket 154 and the other bracket 162. One end of the second shaft 160 is connected to rotate the slider 131 of the meter potentiometer 130 which is mounted on one side of support bracket 162. The second shaft 160 is also connected to rotate the slider 121 of the feedback potentiometer 120 which is mounted on the opposite side of support bracket 162. Rotary motion of the slide valve shaft 32 is transmitted through the shafts 152 and 160 to effect simultaneous operation of adjustment of the potentiometers 120 and 130. If preferred, other means could be provided for operating the potentiometers.

The supporting base 151 is shown as mechanically supporting a plurality of cam operated limit switches such as 165 which are actuated by cams such as 166 on shaft 160 and operable in response to the position of valve spool 21 to perform control functions which are not directly related to the present invention.

OPERATION

The control means in accordance with the invention are selectively operable in either the automatic or the manual mode to effect axial movement of the slide valve spool and thereby control the capacity of the compressor. In the manual mode the control means maintain the slide valve spool in a fixed position so that compressor displacement is fixed and the compressor capacity is at some percentage of full capacity. In the automatic mode the control means sense or monitor a system condition and respond to departure of the condition from a desired level or range to vary the compressor capacity accordingly to the extent necessary to maintain the desired level or range. Operation in the desired mode is effected by actuation of mode selector switch 80.

During operation in the manual mode, adjustment of the manual control potentiometer 100 provides a control signal to the bridge balancing relay 60 which effects operation (opening) of the appropriate solenoid valve 41 or 42 to cause the hydraulic actuator 24 to effect movement of the slide valve spool 21 to a desired fixed position, whereupon the solenoid valve then closes. Movement of the slide valve spool 21 to such position simultaneously adjusts the feedback potentiometer 120 to provide a feedback signal to the bridge balancing relay 60 wherein the feedback signal and the control signal are compared. When the feedback signal and the control signal are balanced, there is no output signal from the bridge balancing relay 60 and the solenoid valves 41 and 42 are closed. If slide valve spool 21 shifts from the desired fixed position for any reason, such movement is sensed by feedback potentiometer 120 which provides a feedback signal to bridge balancing relay 60 wherein it is compared to the control signal and the signal imbalance results in operation of the appropriate solenoid valve 41 or 42 to effect movement of spool 21 back to its original fixed position.

During operation in the automatic mode, adjustment of the automatic control potentiometer 81 in response to a change in the level or range of the system condition being sensed by sensing unit 82 (i.e., pressure) provides a control signal to the bridge balancing relay 60 wherein it is compared to feedback signal information being received from the feedback potentiometer 120. The bridge balancing relay 60 sensing the resistance change taking place in the pressure sensing unit 82 endeavors to balance this resistance change with an equal change of resistance value of the feedback potentiometer 120 and thus provides an output signal for operating the appropriate solenoid valve 41 or 42. The bridge balancing relay 60 will, by energizing the proper solenoid valve 41 or 42, operate the actuator 24 to effect movement of the slide valve spool 21 to a new position wherein compressor capacity is at a level necessary to maintain the system condition at the desired level or range. The relay 60 will keep the appropriate solenoid valve 41 or 42 energized until such time as the automatic control potentiometer 81 and the feedback potentiometer 120 are sending the same resistance signal to the balance relay.

I claim:

1. In combination: a variable capacity compressor having an adjustable control valve for regulating the capacity of said compressor; an actuator for adjusting said control valve; electro-responsive means for operating said actuator; control means for providing a control signal to establish an initial control valve adjustment, said control means including an automatic control unit and a manual control unit which are alternatively and selectively operable, said automatic control unit being responsive to a variable condition to provide a control signal to regulate compressor capacity, said manual control unit being selectively operable to provide a control signal to maintain said control valve in a fixed position; feedback means operable in response to control valve adjustment to provide a feedback signal related thereto; and balancing means for receiving and comparing said control signal and said feedback signal and for providing an output signal related thereto to control said electro-responsive means.

2. A combination according to claim 1 including means responsive to control valve adjustment to provide a visual indication of the capacity at which said compressor is operating.

3. In combination: a variable capacity compressor having an adjustable control valve for regulating the capacity of said compressor; a fluid actuator for adjusting said control valve; solenoid valve means operable to control fluid flow for said actuator to thereby operate said actuator; control means for providing an electric control signal to establish an initial control valve adjustment, said control means including an automatic control unit and a manual control unit which are alternatively and selectively operable, said automatic control unit being responsive to a variable condition to provide a control signal to regulate compressor capacity, said manual control unit being selectively operable to provide a control signal to maintain said control valve in a fixed position; feedback means operable in response to control valve adjustment to provide an electric feedback signal related thereto; and balancing means for comparing said electric control signal and said electric feedback signal and for providing an electric output signal related thereto to control said solenoid valve means.

4. A combination according to claim 3 including means responsive to the adjustment of said adjustable valve to provide a visual indication of the capacity at which said compressor is operating.

5. In combination: a variable-capacity compressor having a movable slide valve for regulating the capacity of said compressor; a fluid actuator operable to move said slide valve; solenoid valve means including a pair of solenoid valves operable to control fluid flow to and from said actuator to operate said actuator; control means for providing an electric control signal to establish slide valve position, said control means including an automatic control unit and a manual control unit which are alternatively and selectively operable, said automatic control unit being responsive to a variable condition to provide a control signal to regulate compressor capacity, said manual control unit being selectively operable to provide a control signal to maintain said slide valve in a fixed position; feedback means responsive to slide valve position for providing an electric feedback signal related to slide valve position; and balancing means for comparing said electric control signal and said electric feedback signal and for providing an electric output signal related thereto to operate said solenoid valve means to effect positioning of said slide valve.

6. A combination according to claim 5 including means responsive to the position of said slide valve to provide a visual indication of the capacity at which said compressor is operating.

7. In combination: a variable capacity compressor having a movable slide valve for regulating the capacity of said compressor; a fluid actuator operable to move said slide valve; solenoid valve means including a pair of solenoid valves operable to control fluid flow to and from said actuator to operate said actuator; control means for providing an electric control signal to effect slide valve positioning, said control means comprising an automatic control unit and a manual control unit which are alternatively and selectively operable, said automatic control unit being responsive to a variable condition to provide a control signal to regulate compressor capacity, said manual control unit being selectively operable to provide a control signal to maintain said slide valve in a fixed position; feedback means responsive to slide valve position for providing an electric feedback signal related to slide valve position; and balancing means for comparing said electric control signal and said electric feedback signal and for providing an electric output signal related thereto to operate said solenoid valve means to position said slide valve.

8. A combination according to claim 7 wherein said automatic control unit includes sensing means for sensing said condition and a first potentiometer adjustable in response to said sensing means for providing an electric control signal related to said condition; wherein said manual control unit includes a second potentiometer selectively adjustable to provide a control signal to position said movable slide valve in a fised position; and wherein said feedback means includes a third potentiometer adjustable in response to slide valve position.

9. A combination according to claim 8 wherein said sensing means is temperature responsive.

10. A combination according to claim 8 wherein said sensing means is pressure responsive.

11. A combination according to claim 8 including indicator means responsive to the position of said slide valve to provide a visual indication of the capacity at which said compressor is operating.

12. A combination according to claim 11 wherein said indicator means includes a fourth potentiometer adjustable in response to slide valve position and a meter connected to receive a signal from said fourth potentiometer and calibrated to show compressor capacity.

13. A variable capacity rotary compressor having a control valve adjustable to control the capacity of the compressor; and control means operable in either an automatic mode or a manual mode to adjust said control valve, said control means including feedback means operable in both said modes, said control means being operable in the manual mode to adjust said control valve to maintain said slide valve in a fixed position, said control means being operable in the automatic mode to adjust said control valve to regulate compressor capacity, said control means including condition sensing means operable in the automatic mode to sense a system condition and being responsive to a departure of the system condition from said predetermined level to effect adjustment of said control valve to vary the compressor capacity to maintain said system condition at said predetermined level.

14. Control means according to claim 13 wherein said system condition is pressure and wherein said condition sensing means includes pressure responsive control means.

15. Control means according to claim 13 wherein said system condition is temperature and said condition sensing means includes temperature responsive control means.

* * * * *